(12) United States Patent
Cailleteau (10) Patent No.: US 10,843,802 B2
(45) Date of Patent: Nov. 24, 2020

(54) HIGH END BUSINESS CLASS SEATING ARRANGEMENT

(71) Applicant: Safran Seats, Plaisir (FR)

(72) Inventor: Jeremy Cailleteau, Saint Aout (FR)

(73) Assignee: Safran Seats, Plaisir (FR)

( * ) Notice: Subject to any disclaimer, the term of this patent is extended or adjusted under 35 U.S.C. 154(b) by 192 days.

(21) Appl. No.: 15/101,000

(22) PCT Filed: Dec. 2, 2014

(86) PCT No.: PCT/IB2014/066530
§ 371 (c)(1),
(2) Date: Jun. 2, 2016

(87) PCT Pub. No.: WO2015/083086
PCT Pub. Date: Jun. 11, 2015

(65) Prior Publication Data
US 2016/0297529 A1    Oct. 13, 2016

Related U.S. Application Data

(60) Provisional application No. 61/910,589, filed on Dec. 2, 2013.

(51) Int. Cl.
*B64D 11/06* (2006.01)
*B64D 11/00* (2006.01)

(52) U.S. Cl.
CPC ...... *B64D 11/0601* (2014.12); *B64D 11/0641* (2014.12); *B64D 2011/0069* (2013.01)

(58) Field of Classification Search
CPC ............ B64D 11/0601; B64D 11/0641; B64D 2011/0069; B64D 11/0606; B64D 11/0604; B60N 2/01; B60N 2/34; B61D 31/00
See application file for complete search history.

(56) References Cited

U.S. PATENT DOCUMENTS 2,608,366 A * 8/1952 Jergenson ................ B60N 2/34
105/315
5,425,516 A * 6/1995 Daines .................... B64D 11/06
105/316
(Continued)

FOREIGN PATENT DOCUMENTS

FR         2953168 A1    6/2011
WO      2009079668 A2    6/2009

OTHER PUBLICATIONS

International Patent Application No. PCT/IB2014/066530 Search Report and Written Opinion dated Mar. 9, 2015.
(Continued)

*Primary Examiner* — Medhat Badawi
*Assistant Examiner* — Vicente Rodriguez
(74) *Attorney, Agent, or Firm* — Kilpatrick Townsend & Stockton LLP (57) ABSTRACT

Described are seating arrangements having at least one aisle column with at least one high bed seating unit and at least one low bed seating unit, and at least one non-aisle column having at least one high bed seating unit and at least one low bed seating unit. The at least one high bed seating unit in the at least one aisle column is positioned laterally proximate the at least one low bed seating unit in the at least one non-aisle column, and the at least one low bed seating unit in the at least one aisle column is positioned laterally proximate the at least one high bed seating unit in the at least one non-aisle column.

16 Claims, 9 Drawing Sheets

(56) References Cited

U.S. PATENT DOCUMENTS

| | | | | |
|---|---|---|---|---|
| 9,533,765 B2* | 1/2017 | Vergnaud | ............... | B64D 11/06 |
| 2003/0218095 A1* | 11/2003 | Saint Jalmes | .......... | B64D 11/00 |
| | | | | 244/118.5 |
| 2009/0066121 A1* | 3/2009 | Jacob | ..................... | A47C 15/00 |
| | | | | 297/118 |
| 2012/0223186 A1 | 9/2012 | Henshaw | | |
| 2012/0223557 A1* | 9/2012 | Henshaw | ............... | B64D 11/06 |
| | | | | 297/232 |
| 2012/0292957 A1* | 11/2012 | Vergnaud | ............... | B64D 11/06 |
| | | | | 297/188.08 |
| 2014/0283296 A1* | 9/2014 | Jerome | .................... | B60N 2/34 |
| | | | | 5/12.1 |
| 2014/0306500 A1* | 10/2014 | Dryburgh | ............... | B64D 11/06 |
| | | | | 297/232 |
| 2015/0166182 A1* | 6/2015 | Ducreux | ................ | B64D 11/06 |
| | | | | 244/118.6 |

OTHER PUBLICATIONS

International Application No. PCT/IB2014/066530, International Preliminary Report on Patentability, dated Jun. 16, 2016.

* cited by examiner

HIGH END BUSINESS CLASS SEATING ARRANGEMENT

CROSS REFERENCE TO RELATED APPLICATIONS

This application is the U.S. national phase entry of International Patent Application Serial No. PCT/IB2014/066530 ("the '530 application"), filed on Dec. 2, 2014, which application is related to and claims priority benefits from U.S. Provisional Application Ser. No. 61/910,589 ("the '589 application"), filed on Dec. 2, 2013, entitled HIGH END BUSINESS CLASS CABIN ARRANGEMENT, the entire contents of each of the '530 and '589 applications incorporated herein by this reference

FIELD OF THE INVENTION

The invention relates to seating arrangements for aircraft cabins and to the corresponding seat unit.

BACKGROUND

Common carriers, such as passenger airlines, bus lines, and train lines, often contain multiple seats in one or more cabins. Subject to their compliance with applicable safety regulations, seating arrangements may vary from carrier to carrier. Whereas passengers may prefer fewer seats per cabin to increase leg-room, privacy, or other factors associated with decreased seat density, common carrier operators may prefer greater seats per cabin to increase revenue per transport. Optimizing, or at least enhancing, both passenger comfort and revenue generation is a significant issue in cabin design and layout.

In the case of business class cabin design, various parameters, such as passenger comfort, bed and seat dimensions, living space, direct access to the aisle, and angle of the bed surface to the cabin floor are additional considerations that influence cabin seating arrangements. For example, for passenger comfort, it is desirable to achieve a horizontal bed surface when in transport or flight.

Numerous seat designs have included compromises on all of these parameters in an attempt to create the highest density seating arrangements that does not significantly impair passenger comfort.

For example, U.S. Publication No. 2012/0292957 teaches the use of a pair of angled seats having a longitudinal overlap between two pairs of seats. In this design, when the seats are in the bed position, there is a vertical overlap between the foot areas of the two side-by-side beds, with one bed having a high position, and the other bed having a low position. In this design, the longitudinal axis of the seats converges toward a point located in the vertical symmetry plane of the next-forward pair of seats. Because a wide passage exists to allow passengers seated in the seat located next to the window to egress the seat, there is a body contact hazard when the seat located next to the aisle is in the bed position, thus creating a feeling of shared living space with the passenger direct neighbor in the paired seats.

As a result, it is desirable to provide a cabin seating arrangement that further maximizes the seat density for business class cabins that also provides horizontal bed arrangement while in flight, while also providing every seat with direct aisle access to eliminate the potential for body contact hazard when a person seated in a seat located next to the window egresses the seat.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a seating arrangement comprises at least one aisle column comprising at least one high bed seating unit and at least one low bed seating unit, and at least one non-aisle column comprising at least one high bed seating unit and at least one low bed seating unit, wherein the at least one high bed seating unit in the at least one aisle column in the bed position is positioned laterally proximate and partially overlapping the at least one low bed seating unit in the at least one non-aisle column in the bed position, wherein the at least one low bed seating unit in the at least one aisle column in the bed position is positioned laterally proximate and partially overlapping the at least one high bed seating unit in the at least one non-aisle column in the bed position.

In some embodiments, the at least one high bed seating unit in the at least one aisle column in a bed position is configured to partially longitudinally overlap with the at least one low bed seating unit in the at least one aisle column in a bed position by a first distance. In certain embodiments, the at least one high bed seating unit in the at least one non-aisle column in the bed position is configured to partially longitudinally overlap with a second low bed seating unit in the at least one non-aisle column in the bed position by a second distance, wherein the second distance is smaller than the first distance.

In some embodiments, a first longitudinal space is located between the at least one high bed seating unit in the at least one aisle column and a second low bed seating unit in the at least one aisle column, and a second longitudinal space is located between the at least one low bed seating unit in the at least one aisle column and a second high bed seating unit in the at least one aisle column. According to some embodiments, the at least one low bed seating unit in the at least one non-aisle column accesses an aisle via the first longitudinal space, and the at least one high bed seating unit in the at least one non-aisle column accesses the aisle via the second longitudinal space.

In certain embodiments, the seating arrangement further comprises at least two privacy shells, each privacy shell positioned between the laterally proximate seating units. In these embodiments, each privacy shell comprises a high bed lateral well and a low bed lateral well. Each privacy shell may further comprise an upper section configured to divide an upper surface of the high bed lateral well into separate armrests for the laterally adjacent seating units.

In certain embodiments, the laterally proximate seating units are arranged to face toward each other.

In some embodiments, at least one aisle column is positioned adjacent an aisle, and the at least one non-aisle column is positioned adjacent a wall of a cabin.

According to some embodiments, the seating arrangement further comprises a plurality of aisle columns and non-aisle columns, wherein each aisle column is positioned adjacent an aisle, and each non-aisle column is positioned adjacent one of the plurality of aisle columns and another one of the plurality of non-aisle columns. In certain embodiments, the seating arrangement is an eight abreast configuration.

According to some embodiments, the seating arrangement further comprises a second aisle column comprising at least one high bed seating unit and at least one low bed seating unit, wherein the second aisle column is positioned adjacent the at least one non-aisle column, wherein the at least one high bed seating unit in the second aisle column is positioned laterally proximate the at least one low bed seating unit in the at least one non-aisle column, wherein the at least one low bed seating unit in the second aisle column is positioned laterally proximate the at least one high bed seating unit in the at least one non-aisle column. In certain embodiments, the seating arrangement is an seven abreast configuration.

According to some embodiments, the seating arrangement further comprises a second aisle column comprising at least one high bed seating unit and at least one low bed seating unit, and a third aisle column comprising at least one high bed seating unit and at least one low bed seating unit, wherein the at least one high bed seating unit in the second aisle column is positioned laterally proximate the at least one low bed seating unit in the third aisle column, and wherein the at least one low bed seating unit in the second aisle column is positioned laterally proximate the at least one high bed seating unit in the third aisle column. In certain embodiments, the seating arrangement is an six abreast configuration.

BRIEF DESCRIPTION OF THE DRAWINGS

The invention will be better understood on reading the following description and examining the Figures that accompany it. These Figures are provided by way of illustration only and are in no way limiting on the invention.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

While the embodiments of vehicle seats may be described with reference to an aircraft seat, they are by no means so limited. In fact, the seats may be used in conjunction with any type of vehicle or otherwise as desired.

According to certain embodiments of the present invention, as shown in FIGS. 1-9, a cabin 14 may include a seating arrangement 10 of a plurality of seating units 12A, and a plurality of seating units 12B.

According to certain embodiments, each seating unit 12A, 12B comprises a seat back 16, a seat pan 18, and a leg rest 20, which are configured to convert from an upright or reclined chair position to a horizontal position, also commonly referred to as a bed position, as shown in FIGS. 1-4 and 6.

Because the combined length of the seat back 16, seat pan 18, and the leg rest 20 in the bed position is typically not long enough for a passenger to lie down in a horizontal position, the leg rest 20 of each seating unit 12A, 12B in the bed position may configured to be positioned proximate a foot well 22A, 22B.

Figure 1:
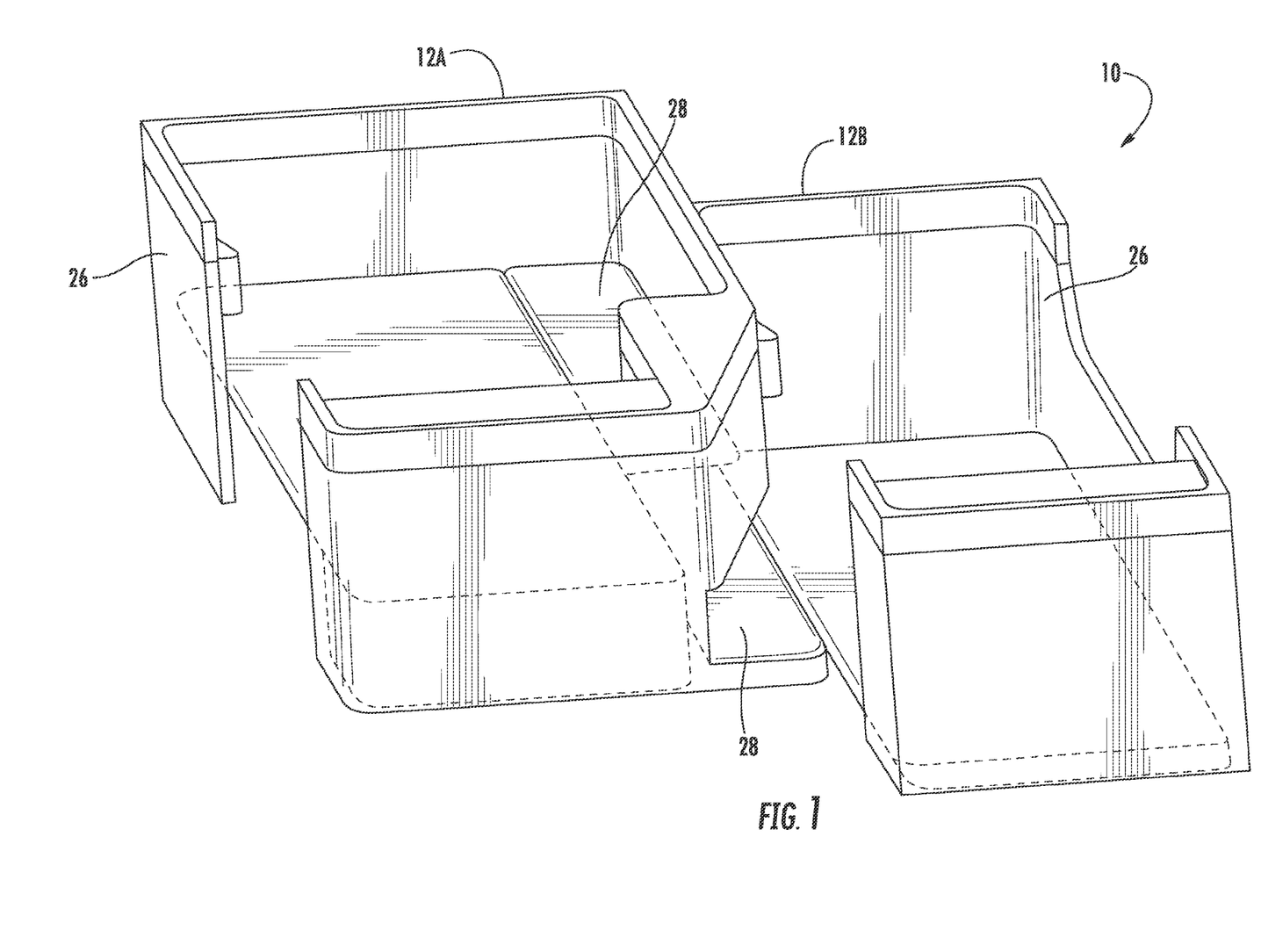
FIG. 1 is a perspective view of a pair of laterally adjacent seating units, according to certain embodiments of the present invention.
Figure 2:
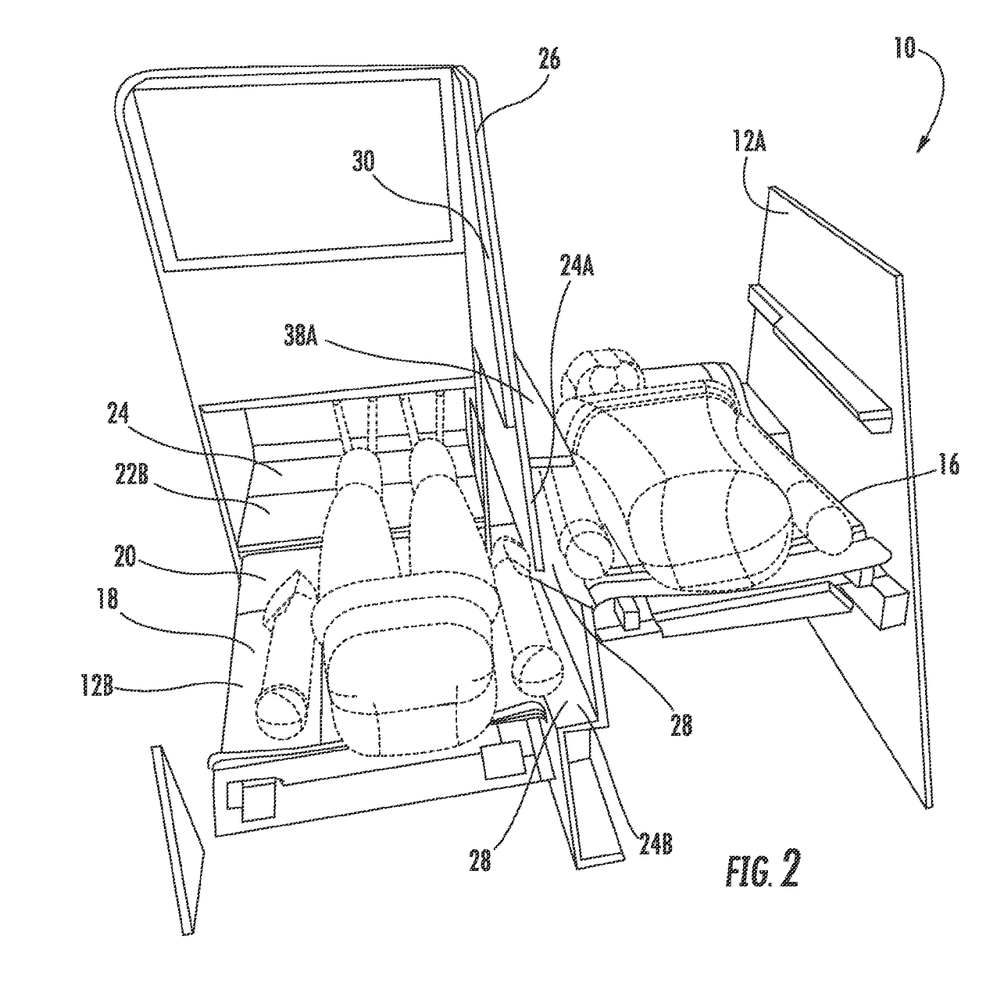
FIG. 2 is a perspective cross-sectional view of a pair of laterally adjacent seating units, according to certain embodiments of the present invention.
Figure 4:
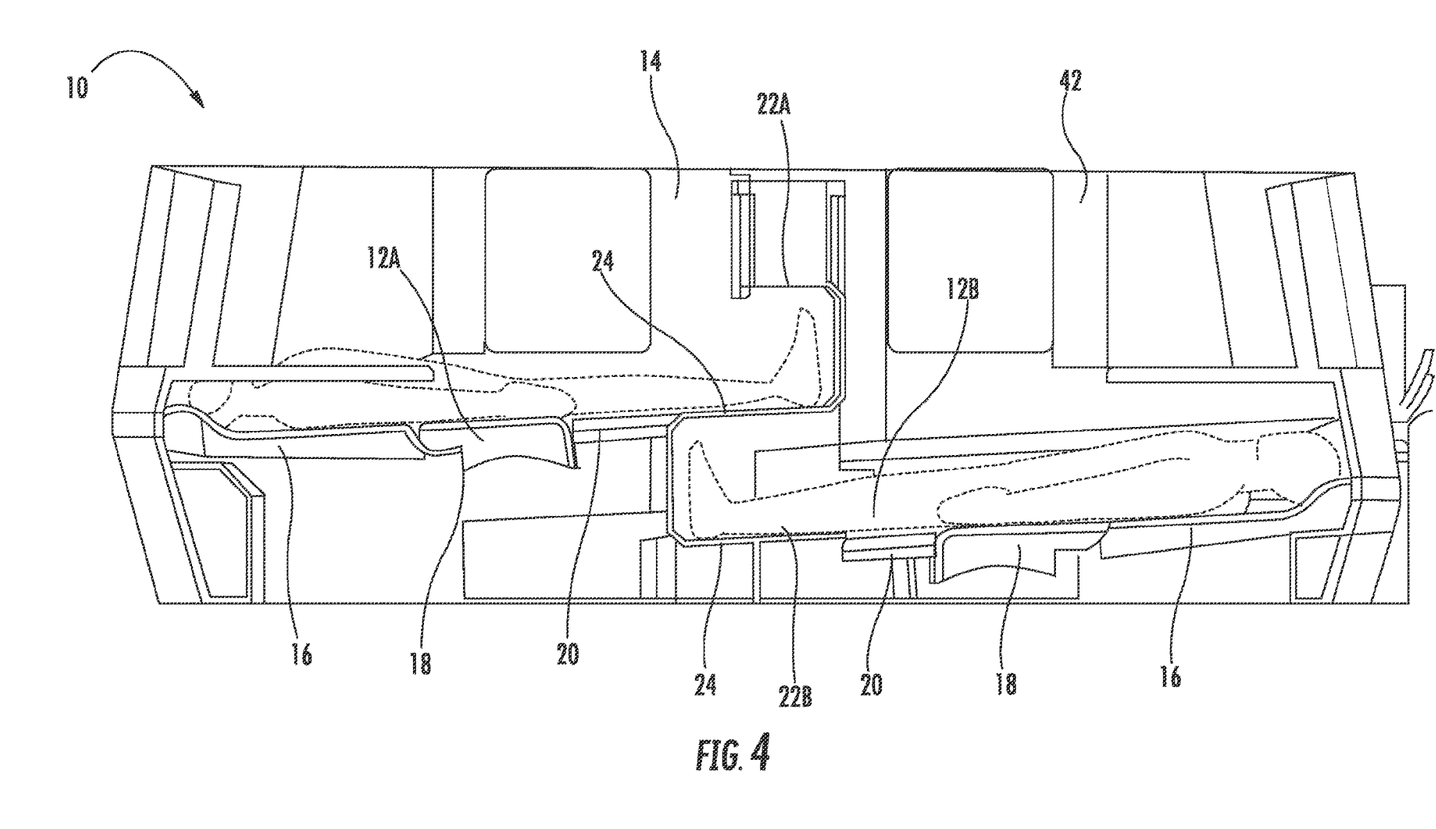
FIG. 4 is a side cross-sectional view of a pair of laterally adjacent seating units, according to certain embodiments of the present invention.

The foot wells 22A, 22B may be positioned within a portion of a privacy shell 26 that separates two longitudinally adjacent seating units 12A, 12B or may be provided as a stand-alone monument positioned between two longitudinally adjacent seating units 12A, 12B. As a result, each foot well 22A, 22B is positioned in front of the corresponding seating unit 12A, 12B. Because the foot well 22A is vertically offset from and substantially overlapping with the foot well 22B, a lower surface 24 of each of the foot wells 22A, 22B is configured to align with the leg rest 20 when the seating unit 12A, 12B is in the bed position, as shown in FIGS. 1-2 and 4. As a result, the combined seating unit 12A, 12B in the bed position and the associated foot wells 22A, 22B provide a comfortable sleeping length for a passenger to lie down in a horizontal position.

Figure 3:
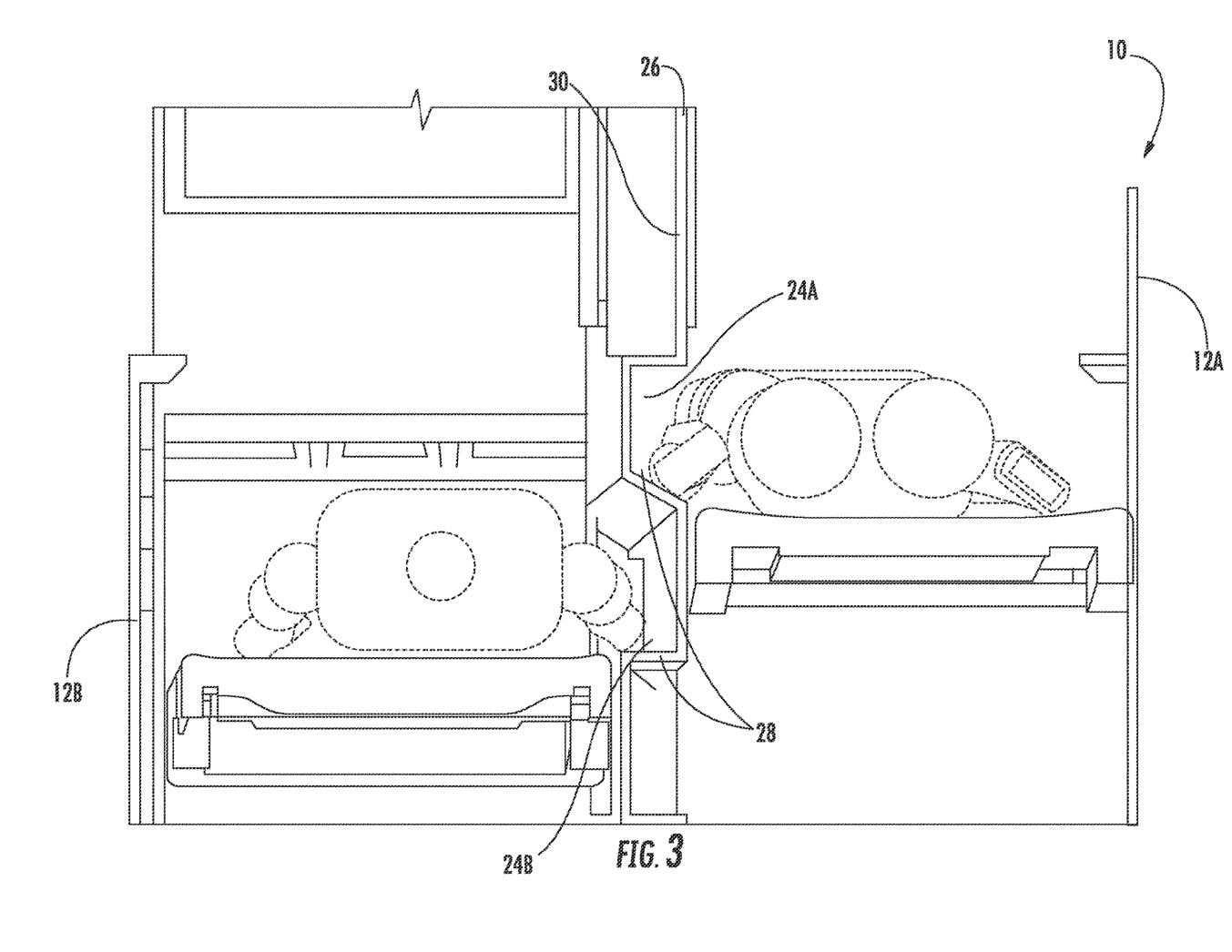
FIG. 3 is a front cross-sectional view of a pair of laterally adjacent seating units, according to certain embodiments of the present invention.

To further maximize lateral sleeping space for each passenger, additional lateral wells 24A, 24B may be provided within a portion of the privacy shell 26 that separates two laterally adjacent seating units 12A, 12B, and therefore is positioned to one side of the particular seating unit 12A, 12B. Similar to the foot wells 22A, 22B, because the lateral well 24A is vertically offset from and substantially overlapping with the lateral well 24B, a lower surface 28 of each of the lateral wells 24A, 24B is configured to align with the seat back 16, seat pan 18, and/or leg rest 20 when the seating unit 12A, 12B is in the bed position, as shown in FIGS. 1-3.

In order to also maximize space within the cabin 14, the seating units 12A may be configured to have a first bed position (or high bed position), and the seating units 12B may be configured to have a second bed position (or low bed position) that is vertically offset from the first bed position (or vice versa). In this configuration, a difference in height between the high bed position and the low bed position is arranged so that the foot wells 22A, 22B may be positioned in an overlapping arrangement, and the lateral wells 24A, 24B may be positioned in an overlapping arrangement, as best illustrated in FIGS. 1-4. In certain embodiments, the vertical distance between the height of the high bed position and the low bed position is not less than 10 inches, and may range from 13 to 15 inches. By providing a suitable height difference that is not too large, the sleeping experience between the two seating units 12A, 12B is balanced so that one seat is not too low, and the other seat is not too high.

An upper section 30 of the privacy shell 26 may be configured to bisect an upper surface of the lateral well 24A to divide the surface into armrests 38A, 38B for the two laterally adjacent seating units 12A, 12B.

Figure 7:
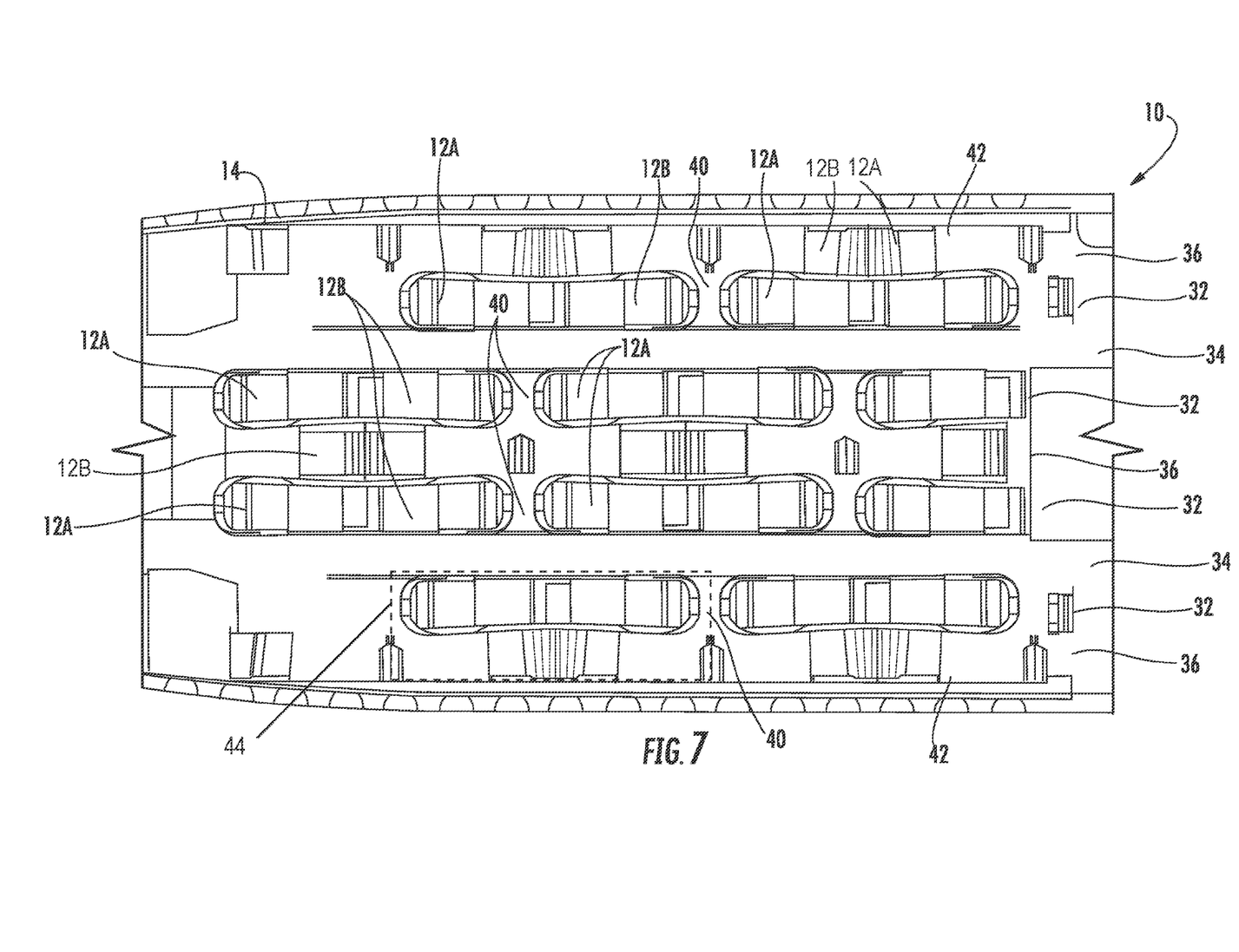
FIG. 7 is a top view of a seven abreast seating arrangement, according to certain embodiments of the present invention.
Figure 8:
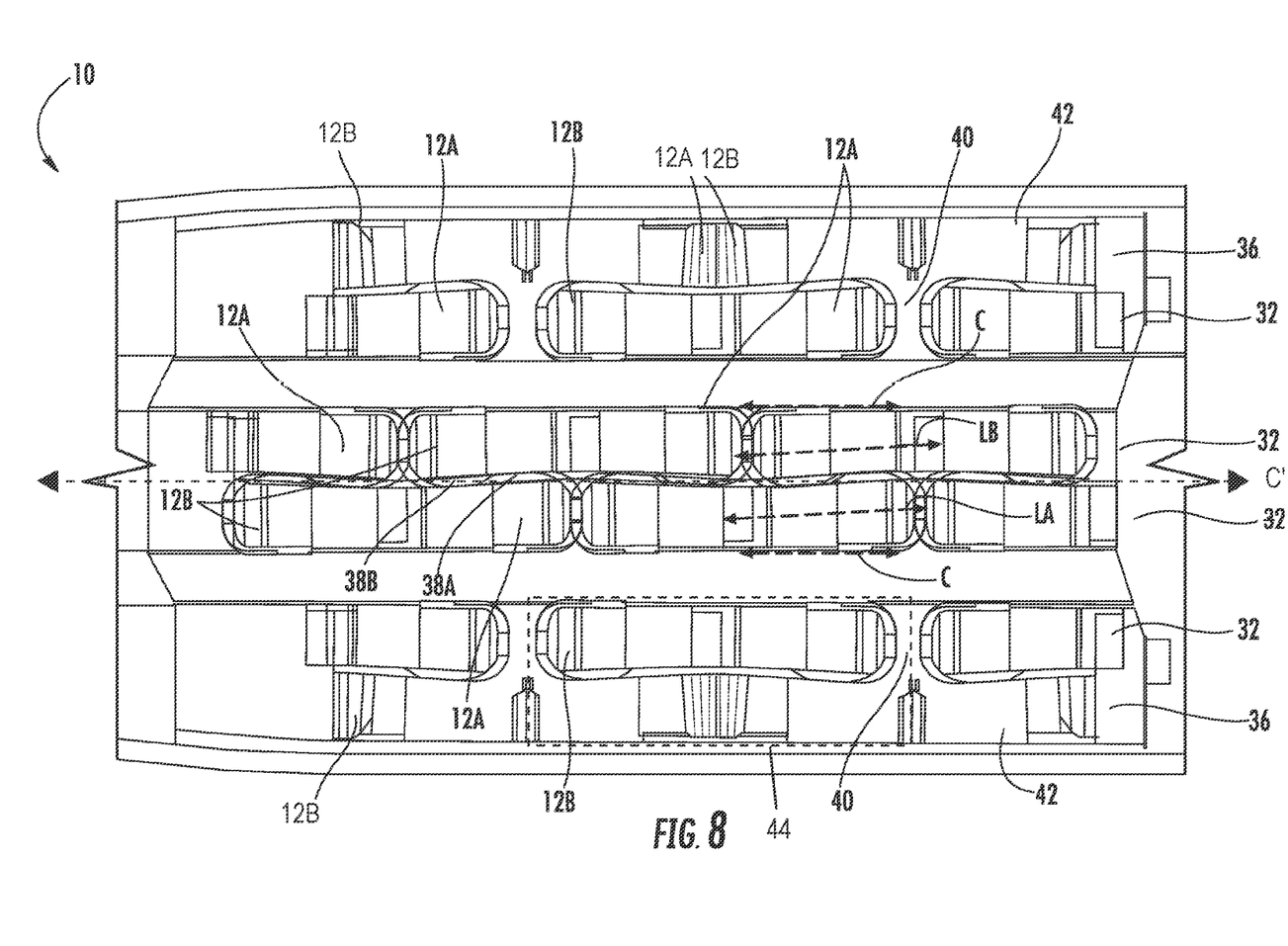
FIG. 8 is a top view of a six abreast seating arrangement, according to certain embodiments of the present invention.
Figure 9:
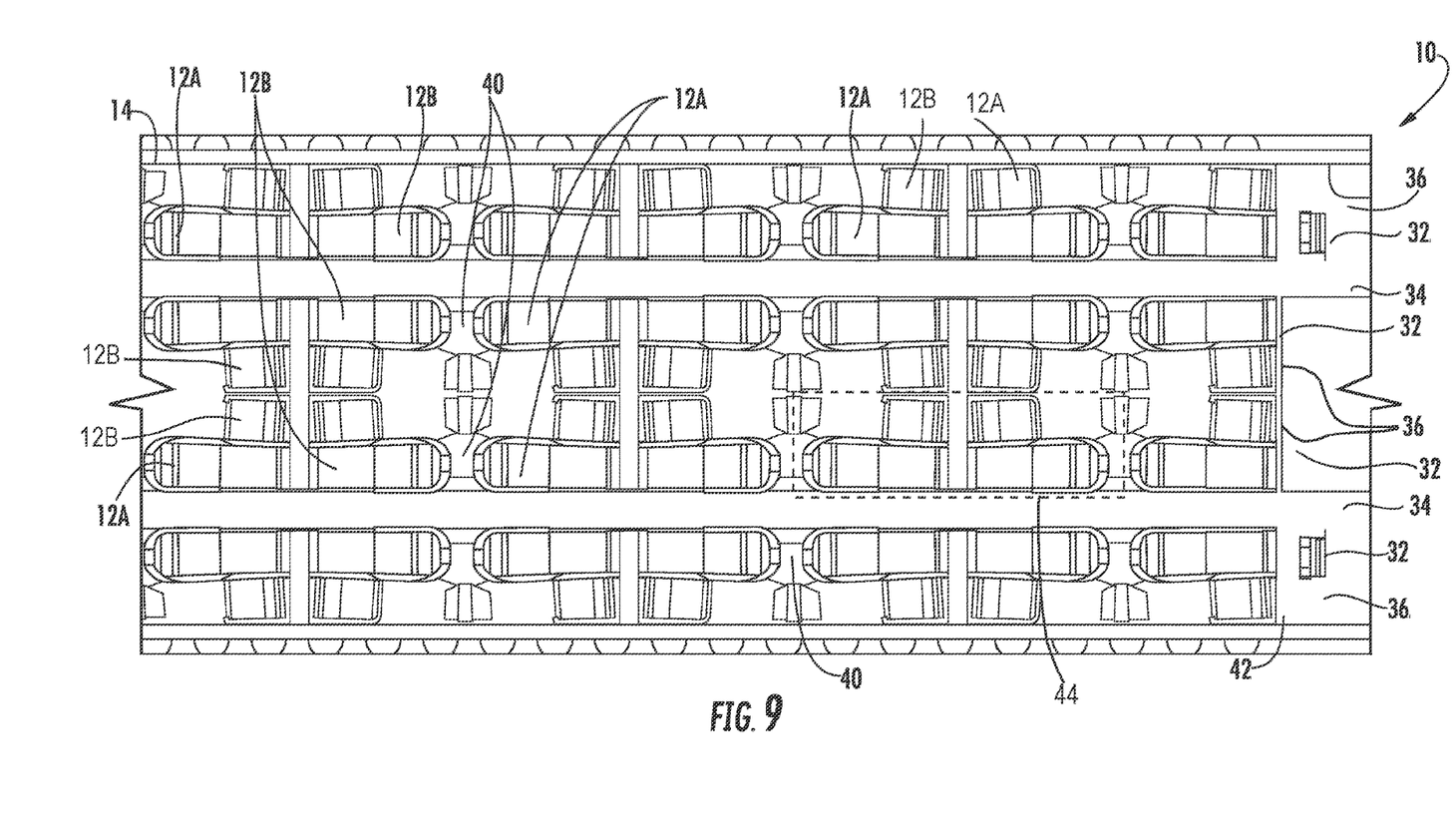
FIG. 9 is a top view of an eight abreast seating arrangement, according to certain embodiments of the present invention.

In these embodiments, as best illustrated in FIGS. 7-9, a standard four-seat unit 44 comprises two substantially longitudinally aligned and alternating facing seating units 12A, 12B in an aisle column 32, and two substantially longitudinally aligned and alternating facing seating units 12A, 12B in a non-aisle column 36.

Each seating unit 12A, 12B in the aisle column 32 is configured to have direct aisle access without the need to pass by or through another seating unit 12A, 12B to access the aisle 34. In contrast, because these seating units 12A, 12B in the non-aisle column 36 are not positioned proximate an aisle 34, these seating units 12A, 12B access one of the aisles 34 through a longitudinal space 40 located between the non-mating seating units 12A, 12B within the aisle column 32.

Because of the additional longitudinal space 40 between the non-mating seating units 12A, 12B within the aisle column 32, the seating units 12A, 12B in the non-aisle column 36 that face one another are spaced farther apart so that the seating units 12A, 12B will properly align and overlap with the adjacent seating unit 12A, 12B in the aisle column 32, and therefore may have a smaller degree of overlap (or no overlap) in the foot wells 22A, 22B to achieve the necessary bed length for a passenger to lie down in a horizontal position in the seating units 12A, 12B in the non-aisle columns 36.

As a result, in these four-seat units 44, the seating unit 12A (in the high bed position) in the aisle column 32 is laterally adjacent and partially overlapping with the seating unit 12B (in the low bed position) in the non-aisle column 36, and the seating unit 12A (in the high bed position) in the non-aisle column 36 is laterally adjacent and partially overlapping with the seating unit 12B (in the low bed position) in the aisle column 32. As a result, the two laterally adjacent seating units 12A, 12B share the portion of the privacy shell 26 that separates the two laterally adjacent seating units 12A, 12B, and therefore have access to the corresponding overlapping lateral wells 24A, 24B.

In other words, the four-seat units 44 may be replicated through the cabin 14 to achieve the desired seating capacity.

As shown in FIGS. 5-9, these four-seat units 44 may be positioned between the aisle 34 and the wall 42 of the cabin 14 with the aisle column 32 adjacent the aisle 34, and the non-aisle column 36 adjacent the wall 42.

In certain embodiments, as shown in FIG. 9, these four-seat units 44 may laterally doubled and positioned between the aisles 34, with the aisle columns 32 adjacent the aisles 34, and the non-aisle columns 36 positioned adjacent each other along the center axis C' of the cabin 14. In these configurations, the cabin 14 may have an eight abreast configuration.

In other embodiments, as shown in FIG. 7, the four-seat units 44 in the center of the cabin 14 may be modified to include the two aisle columns 32 positioned between the aisles 34, and one non-aisle column 36 positioned adjacent the two aisle columns 32. In these configurations, the cabin 14 may have a seven abreast configuration.

Figure 5:
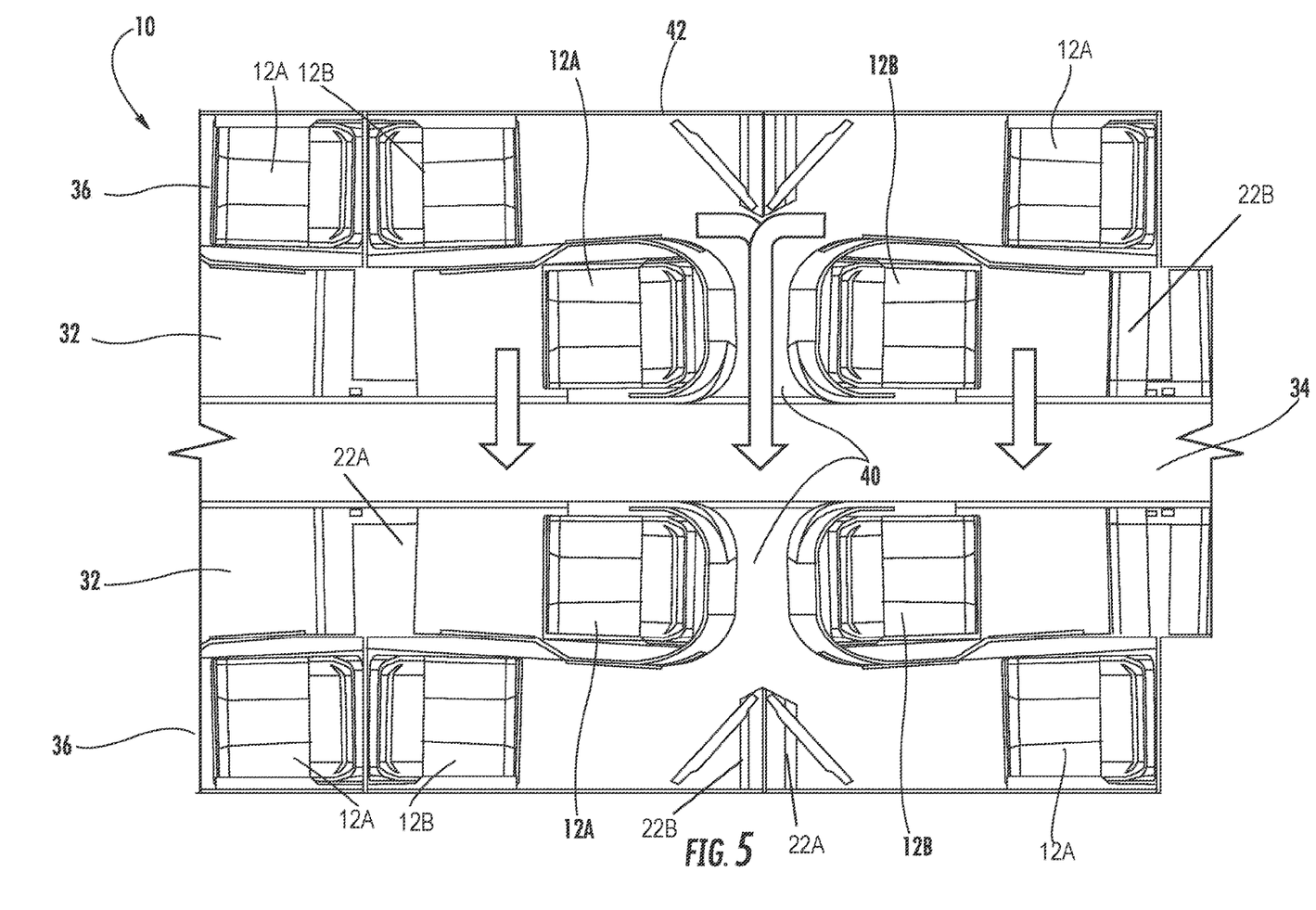
FIG. 5 is a partial top view of a seating arrangement, according to certain embodiments of the present invention.

In yet other embodiments, as shown in FIGS. 5 and 8, the four-seat units 44 in the center of the cabin 14 may be modified to include only the two aisle columns 32 positioned between the aisles 34. Because there are no non-aisle columns 36 with seating units 12A, 12B that require access to the aisle 34 in the center of the cabin 14, the seating units 12A, 12B in the aisle columns 32 may be positioned so that the privacy shells 26 are in direct contact with one another without any longitudinal spaces 40 between seating units 12A, 12B. In these configurations, the cabin 14 may have a six abreast configuration.

A person of ordinary skill in the relevant art will understand that, depending on bed dimensions, seat widths, cabin dimensions, etc., other combinations of aisle columns 32 and non-aisle columns 36 may be possible to achieve the desired number of seats abreast the cabin 14.

Figure 6:
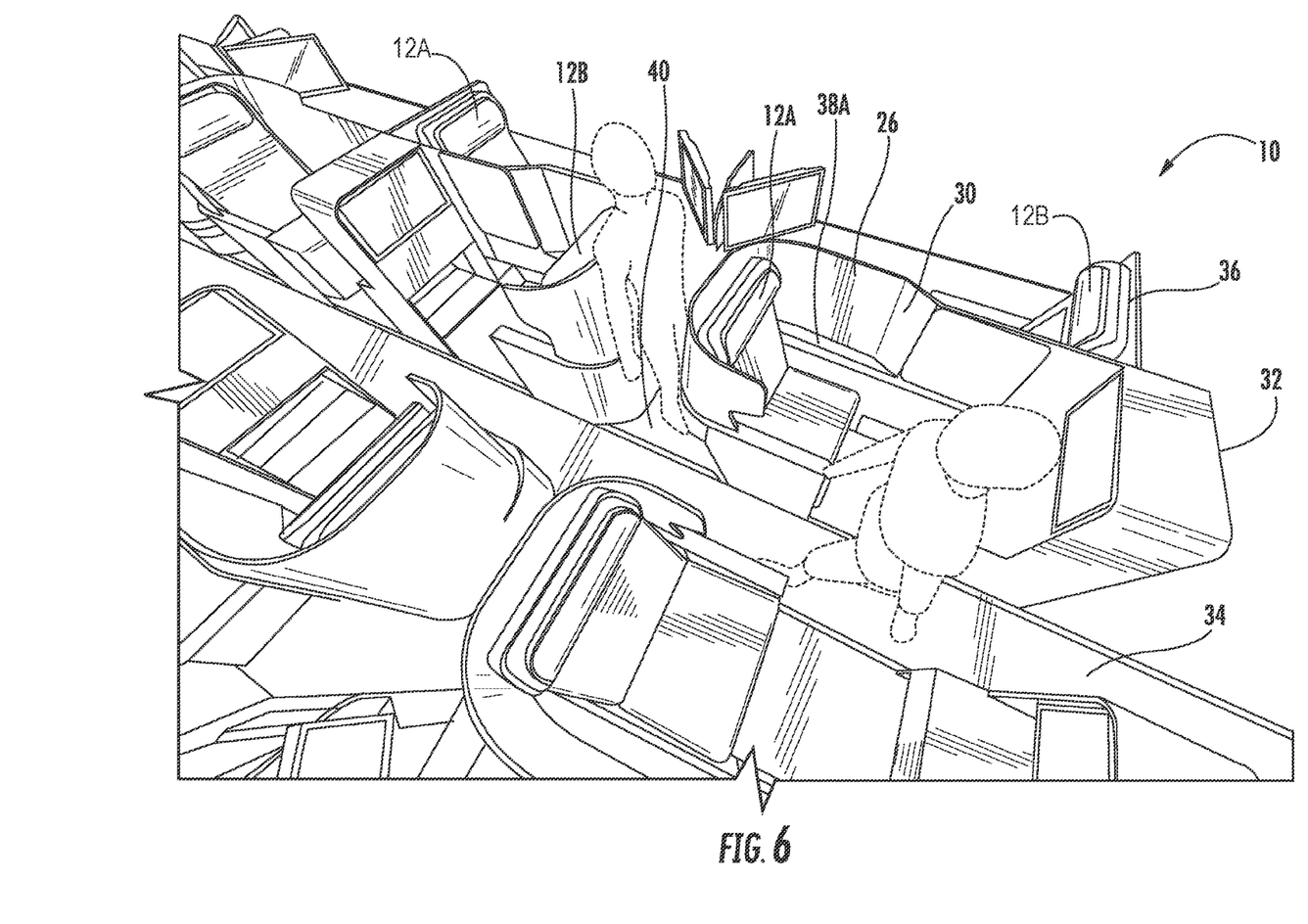
FIG. 6 is a partial top perspective view of a seating arrangement, according to certain embodiments of the present invention.

In certain embodiments where the longitudinal space 40 is provided between the proximate and non-mating seating units 12A, 12B within the aisle columns 32, as illustrated in FIG. 6, the longitudinal space 40 may also serve as an alcove for persons to temporarily clear the aisle as needed for others to pass and/or for service carts or the like. Because the longitudinal space 40 is located between the proximate and non-mating seating units 12A, 12B, the passengers seated in the seating units 12A, 12B in the non-aisle columns 36 are able to access the aisle without having to cross over another passenger, thus eliminating the potential for body contact hazard with persons seated in the seating units 12A, 12B in the aisle columns 32.

In other embodiments, the laterally adjacent seating units may be integrally formed or connected as a double, triple, quad, or other suitably-sized seat unit.

In certain embodiments, as best illustrated in FIG. 8, the seats within seating units 12A may form a longitudinal axis LA, and the seats within the seating units 12B may form a longitudinal axis LB. In certain embodiments, LA and LB may be substantially parallel to one another, while also forming an angle with a center axis C of the overall seating unit 12A, 12B (wherein the center axis C may be positioned parallel to the center axis C' of the cabin 14).

In certain embodiments, when in the upright or reclined chair positions, the seating units 12A, 12B are positioned at the height associated with the TTL position. Thus, to convert the seating units 12A, 12B between the upright or reclined chair position and the bed position, the seating units 12A are raised from the height of the TTL position to the height of the high bed position (and vice versa), and the seating units 12B are lowered from the height of the TTL position to the height of the low bed position (and vice versa). These movements of the seating units 12A, 12B may be performed by any mechanical or electronic device having a configuration that allows for the desired movements described above, including but not limited to electronic actuators and gas springs.

Different arrangements of the components depicted in the drawings or described above, as well as components and steps not shown or described are possible. Similarly, some features and sub-combinations are useful and may be employed without reference to other features and subcombinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

What is claimed is:

1. A seating arrangement comprising:
   at least one aisle column comprising at least one high bed seating unit and at least one low bed seating unit; and
   at least one non-aisle column comprising at least one high bed seating unit and at least one low bed seating unit;
   wherein the at least one high bed seating unit in the at least one aisle column is positioned laterally proximate the at least one low bed seating unit in the at least one non-aisle column;
   wherein the at least one high bed seating unit overlaps at least a substantial length of a longitudinal edge of the at least one low bed seating unit, and at least a substantial length of a longitudinal edge of the at least one high bed seating unit overlaps the at least one low bed seating unit;
   wherein a seat within the at least one high bed seating unit in the at least one aisle column and a seat within the at least one low bed seating unit in the non-aisle column are arranged to face toward each other.

2. The seating arrangement of claim 1, wherein the at least one high bed seating unit in the at least one aisle column is configured to partially longitudinally overlap with the at least one low bed seating unit in the at least one aisle column by a first distance when viewed from above when each seat within the at least two seating units is positioned in a substantially horizontal bed position.

3. The seating arrangement of claim 2, wherein the at least one high bed seating unit in the at least one non-aisle column is configured to partially longitudinally overlap with a second low bed seating unit in the at least one non-aisle column by a second distance when viewed from above when each seat within the at least two seating units is positioned in a substantially horizontal bed position, wherein the second distance is smaller than the first distance.

4. The seating arrangement of claim 1, wherein a first longitudinal space is located between the at least one high bed seating unit in the at least one aisle column and a second low bed seating unit in the at least one aisle column, and a second longitudinal space is located between the at least one low bed seating unit in the at least one aisle column and a second high bed seating unit in the at least one aisle column.

5. The seating arrangement of claim 4, wherein the at least one low bed seating unit in the at least one non-aisle column accesses an aisle via the first longitudinal space, and the at least one high bed seating unit in the at least one non-aisle column accesses the aisle via the second longitudinal space.

6. The seating arrangement of claim 1, further comprising at least two privacy shells, each privacy shell positioned between the laterally proximate seating units.

7. The seating arrangement of claim 6, wherein each privacy shell comprises a high bed lateral well and a low bed lateral well.

8. The seating arrangement of claim 7, wherein each privacy shell further comprises an upper section configured to divide an upper surface of the high bed lateral well into separate armrests for the laterally proximate seating units.

9. The seating arrangement of claim 1, wherein the seat within at least one high bed seating unit in the at least one non-aisle column and the seat within the at least one low bed seating unit in the at least one aisle column are arranged to face toward each other.

10. The seating arrangement of claim 1, wherein the at least one aisle column is positioned adjacent an aisle, and the at least one non-aisle column is positioned adjacent a wall of a cabin.

11. The seating arrangement of claim 1, comprising a plurality of aisle columns and non-aisle columns, wherein each of the plurality of aisle columns is positioned adjacent an aisle, and each non-aisle column is positioned adjacent one of the plurality of aisle columns and adjacent a wall of a cabin or another one of the plurality of non-aisle columns.

12. The seating arrangement of claim 11, wherein the seating arrangement is an eight abreast configuration.

13. The seating arrangement of claim 1, further comprising:
   a second aisle column comprising at least one high bed seating unit and at least one low bed seating unit;
   wherein the second aisle column is positioned adjacent the at least one non-aisle column;
   wherein the at least one high bed seating unit in the second aisle column is positioned laterally proximate the at least one low bed seating unit in the at least one non-aisle column; and
   wherein the at least one low bed seating unit in the second aisle column is positioned laterally proximate the at least one high bed seating unit in the at least one non-aisle column.

14. The seating arrangement of claim 13, wherein the seating arrangement comprises seven columns of seating units.

15. The seating arrangement of claim 1, further comprising:
   a second aisle column comprising at least one high bed seating unit and at least one low bed seating unit; and
   a third aisle column comprising at least one high bed seating unit and at least one low bed seating unit;
   wherein the at least one high bed seating unit in the second aisle column is positioned laterally proximate the at least one low bed seating unit in the third aisle column; and
   wherein the at least one low bed seating unit in the second aisle column is positioned laterally proximate the at least one high bed seating unit in the third aisle column.

16. The seating arrangement of claim 15, wherein the seating arrangement comprises six columns of seating units.

* * * * *